US009827968B2

United States Patent
Bradley et al.

(10) Patent No.: US 9,827,968 B2
(45) Date of Patent: Nov. 28, 2017

(54) HYDRAULIC BICYCLE SYSTEM

(71) Applicant: SRAM, LLC, Chicago, IL (US)

(72) Inventors: Adam Bradley, Colorado Springs, CO (US); Paul Gallagher, Colorado Springs, CO (US)

(73) Assignee: SRAM, LLC, Chicago, IL (US)

(*) Notice: Subject to any disclaimer, the term of this patent is extended or adjusted under 35 U.S.C. 154(b) by 158 days.

(21) Appl. No.: 14/594,731

(22) Filed: Jan. 12, 2015

(65) Prior Publication Data

US 2016/0200392 A1 Jul. 14, 2016

(51) Int. Cl.
*B62L 3/02* (2006.01)
*B60T 17/04* (2006.01)
*F16L 29/02* (2006.01)

(52) U.S. Cl.
CPC ............ *B60T 17/043* (2013.01); *B62L 3/02* (2013.01); *B62L 3/023* (2013.01); *F16L 29/02* (2013.01)

(58) Field of Classification Search
CPC .. B62L 3/023; B62L 3/02; B62L 5/006; B60T 17/043; B60T 11/16; B60T 7/102; F16L 29/02
See application file for complete search history.

(56) References Cited

U.S. PATENT DOCUMENTS

| | | | | |
|---|---|---|---|---|
| 1,739,584 A * | 12/1929 | Farmer | ................. | B60T 17/043 303/86 |
| 2,392,501 A * | 1/1946 | Pool | ........................ | F16L 29/02 251/321 |
| 2,934,217 A * | 4/1960 | Kershaw | ............... | B60T 17/043 137/493 |
| 4,921,081 A | 5/1990 | Chilcote | | |
| 5,678,665 A * | 10/1997 | Debreczeni | ............. | B60T 11/16 188/196 M |
| 6,009,902 A * | 1/2000 | Troiani | .................... | F16L 37/28 137/614.11 |
| 6,237,632 B1 * | 5/2001 | Smith, III | ............. | E21B 33/038 137/613 |
| 2003/0121262 A1 * | 7/2003 | Lumpkin | ................. | B60T 11/22 60/594 |
| 2003/0121736 A1 * | 7/2003 | Lumpkin | ................ | B60T 7/102 188/151 R |
| 2005/0087245 A1 * | 4/2005 | Magnus | .................. | F16L 29/02 137/877 |
| 2007/0215417 A1 * | 9/2007 | Chen | ....................... | B62L 3/023 188/24.22 |

(Continued)

FOREIGN PATENT DOCUMENTS

CN 103963903 8/2014
EP 1514758 3/2005

(Continued)

*Primary Examiner* — Xuan Lan Nguyen

(57) ABSTRACT

A normally closed port valve seals a hydraulic hose connection port of a hydraulic bicycle component. Connection of an end of a hydraulic hose assembly to the port opens the valve, placing the assembly's hydraulic fluid chamber in fluid communication with the interior of the hose assembly. A hydraulic cylinder of the assembly is in fluid communication with the chamber. A spring may be used to bias the valve to a closed condition and simultaneously to bias a brake actuating piston to a non-actuated position.

41 Claims, 16 Drawing Sheets

(56) References Cited

U.S. PATENT DOCUMENTS

| | | | |
|---|---|---|---|
| 2007/0283692 A1* | 12/2007 | Tetsuka | B60T 7/102 60/594 |
| 2008/0302101 A1* | 12/2008 | Dunlap | B60T 7/102 60/594 |
| 2009/0120751 A1* | 5/2009 | Lin | B60T 7/10 188/344 |
| 2009/0205330 A1* | 8/2009 | Dunlap, III | B60T 7/102 60/584 |
| 2011/0048873 A1* | 3/2011 | Wang | B60T 7/102 188/72.6 |
| 2014/0034174 A1 | 2/2012 | Kariyama et al. | |
| 2014/0034428 A1 | 2/2012 | Kariyama et al. | |
| 2014/0034429 A1 | 2/2012 | Kariyama et al. | |
| 2014/0038757 A1 | 2/2012 | Kariyama et al. | |
| 2012/0273308 A1 | 11/2012 | Uchida | |
| 2013/0008751 A1* | 1/2013 | Dunlap, III | B62L 3/023 188/347 |
| 2013/0228407 A1* | 9/2013 | Eberlein | B60T 11/18 188/344 |
| 2014/0027215 A1 | 1/2014 | Wen | |
| 2014/0131606 A1* | 5/2014 | Smith, III | E21B 33/0355 251/282 |
| 2014/0225364 A1* | 8/2014 | Tsai | B62L 3/023 285/247 |
| 2014/0230934 A1 | 8/2014 | Chen | |

FOREIGN PATENT DOCUMENTS

| | | |
|---|---|---|
| EP | 2431647 | 3/2012 |
| TW | M310861 U | 5/2007 |
| TW | M427340 U | 4/2012 |

\* cited by examiner

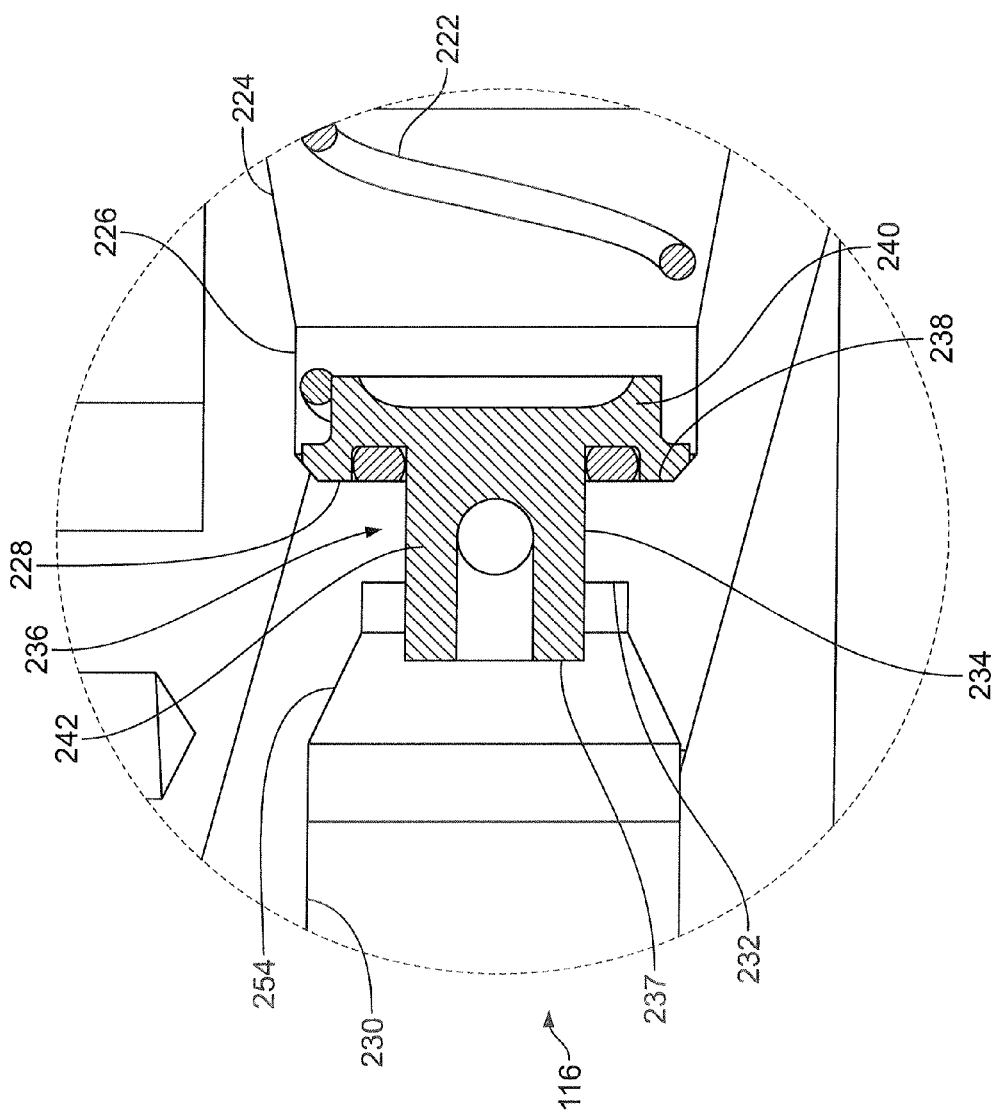

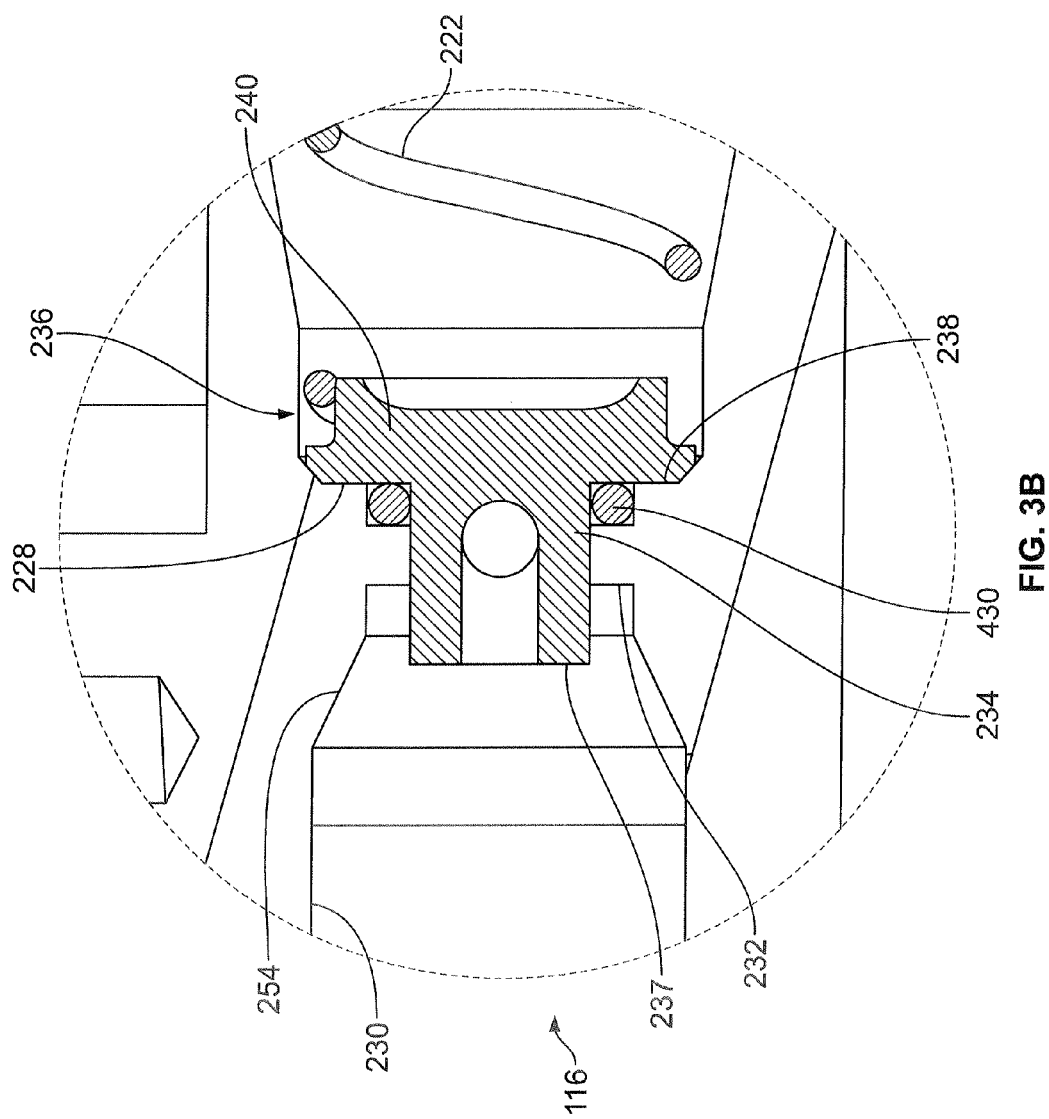

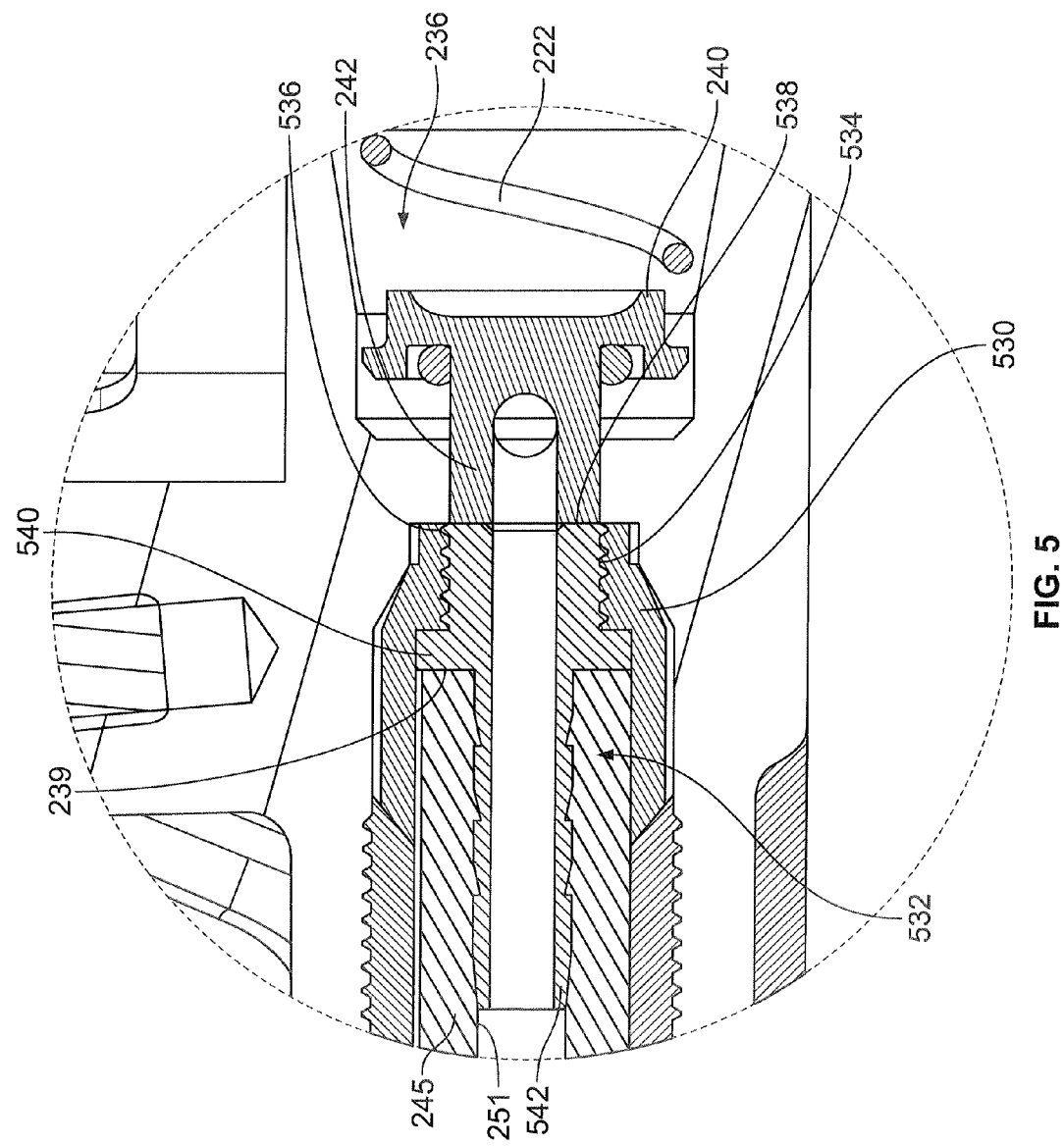

HYDRAULIC BICYCLE SYSTEM

BACKGROUND OF THE INVENTION

This invention generally relates to a hydraulic bicycle system. More specifically, this invention relates to a hydraulic bicycle component and/or a hydraulic hose assembly that are used in a hydraulic bicycle system.

An example of a hydraulic bicycle system is a hydraulic brake system. A typical hydraulic brake system includes a brake hand lever assembly that is fluidly coupled to a brake caliper assembly by a hydraulic hose assembly. To actuate the brake, the rider squeezes the hand lever. Through a cam or other linkage, this squeezing motion advances a primary piston down the axis of a hydraulic primary cylinder. This pressurizes and displaces hydraulic fluid in the chamber forward of the piston head. The chamber, and its fluid content, is in fluid communication with the fluid-filled hydraulic hose assembly by way of a hand lever assembly connection port. A emote end of the hydraulic hose assembly in turn is connected to another connection port on the housing of the caliper assembly. The caliper assembly contains at least one, and may contain several, secondary cylinders with secondary pistons that slide along the respective axes of their, cylinders. This latter piston movement will be translated by the caliper assembly into a clamping force on the rim or disk. Hence, advancement of the piston within the primary cylinder pressurizes and displaces hydraulic fluid ahead of it, and this results in hydraulic fluid in the caliper assembly housing advancing piston(s) within their respective secondary cylinders.

An issue peculiar to hydraulic brake systems is the prevention or minimization of the introduction of air into the hydraulic brake lines, cylinders and fluid chambers. A consideration which hydraulic bicycle brake systems share with other hand-actuated bicycle controls is to reduce, as much as possible, the aerodynamic drag of the cables and hoses. To minimize such drag, designers seek to route the lines through the bicycle frame, through frame holes that are made as small as possible. In order to route a hydraulic brake hose, the hose must be separated from either the brake lever assembly or the brake caliper assembly and fed through frame entry and exit points. Given that the hydraulic brake system requires full fluid volume and a minimal quantity of entrapped air to function properly, the process of disconnecting and reconnecting the brake hose to the brake assembly(ies) should minimize the loss of brake fluid and entry of air into the system.

SUMMARY OF THE INVENTION

In one aspect of the invention, a hydraulic bicycle component is provided that has a housing adapted to be affixed to a frame or handlebar of a bicycle. The housing includes a cylinder defining a hydraulic fluid chamber and a hydraulic hose connection port adapted to be connected to a hydraulic hose assembly. A piston assembly includes a piston slidably disposed within the cylinder. The piston configured to slide between a non-actuated and an actuated position. A port valve assembly includes a port valve configured to move between an open position that places the hose assembly in fluid communication with the fluid chamber, and a closed position that seals the connection port. The valve moves to the open position responsive to the connection of a hydraulic hose assembly to the connection port.

In a further aspect of the invention, the port valve is biased toward the closed position and the piston is biased toward the non-actuated position. A single spring may bias the port valve and the piston. The port valve may be responsive to fluid pressure within the hydraulic fluid chamber.

In another aspect of the invention, at least a portion of the port valve is disposed within the same cylinder in which the piston is disposed.

According to a further aspect of the invention, the bicycle component includes an attachment member that is adapted to be affixed to a handlebar or frame of a bicycle. The hydraulic hose connection port is disposed proximate to the attachment member.

In combination with any of the above aspects of the invention, the hose connection port may include a hose connection bore that is adapted to receive the hydraulic hose assembly. An inner end of the hose connection bore may be defined by a port external wall. The hydraulic fluid chamber may have an end wall opposed to the port external wall, and a connection port passage may be formed between the port external wall and the end wall of the hydraulic fluid chamber. The port valve may have a base and a shaft which forwardly extends from the base and into the connection port passage. A first valve port rearwardly extends from a free end of the shaft. At least one second valve port opens on the shaft sidewall and intersects the first valve port. A forward face of the valve base seals with the hydraulic fluid chamber end wall when the port valve is in the closed position. In this position, the free end of the shaft protrudes into the hose connection bore, and the second port is occluded by a sidewall of the connection port passage. When the hydraulic hose assembly is inserted into the hose connection bore, an end of the hose assembly will contact the free end of the valve shaft and displace the port valve rearwardly. The forward face of the base then unseals from the fluid end wall and the second valve port is placed in fluid communication with the hydraulic fluid chamber.

In another aspect of the invention, a hydraulic hose assembly for a hydraulic bicycle component is provided. The hydraulic hose assembly includes a hose having a bore, a hose end member and a hose sealing member. The hose end member includes a stem portion disposed in the hose bore and a head portion extending beyond an end of the hose. The head portion has a contact surface for contacting the port valve of the hydraulic bicycle component. The hose sealing member sealingly engages the hose and the hose end member. The head portion of the hose end member is configured to inhibit the hose sealing member from deformably displacing beyond the contact surface of the head portion when the hydraulic hose assembly is connected to the hydraulic hose connection port of the hydraulic bicycle component.

In yet another aspect of the invention, a hydraulic system for a bicycle is provided. The hydraulic system includes a hydraulic bicycle component and a hydraulic hose assembly. The hydraulic bicycle component includes a housing, a piston assembly and a port valve assembly. The housing is adapted to be affixed to a frame or handlebar of the bicycle and includes a cylinder defining a hydraulic fluid chamber and a hydraulic hose connection port connected to the hydraulic hose assembly. The piston assembly includes a piston slidably disposed within the cylinder. The port valve assembly includes a port valve configured to move between an open position placing the hydraulic hose assembly in fluid communication with the hydraulic fluid chamber and a closed position sealing the hydraulic hose connection port. The port valve is the only valve moved to place the hydraulic hose assembly in fluid communication with the hydraulic fluid chamber responsive to the connection of the hydraulic hose assembly to the hydraulic hose connection port. The hydraulic hose assembly includes a hose having a bore, a hose end member and a hose sealing member. The hose end member includes a stem portion disposed in the hose bore and a head portion extending beyond an end of the hose. The head portion has a contact surface for contacting the port valve of the hydraulic bicycle component. The hose sealing member sealingly engages the hose and the hose end member. The head portion of the hose end member is configured to inhibit the hose sealing member from deformably displacing beyond the contact surface of the head portion when the hydraulic hose assembly is connected to the hydraulic hose connection port of the hydraulic bicycle component.

The invention permits a hydraulic bicycle component, such as a brake hand lever assembly or a brake caliper assembly, to be filled with hydraulic fluid and shipped in this condition. A hydraulic bicycle component may be shipped to a customer in a separated format and re-assembled at system installation without compromising hydraulic bleed quality, and in a way which minimizes ingestion of air and fluid loss. The invention facilitates the routing of hydraulic lines through small-diameter internal passageways of a bicycle frame prior to their connection to the brake hand lever assembly and/or brake caliper assembly. Further, the invention may ensure proper insertion of the hydraulic hose assembly into the hydraulic bicycle component.

BRIEF DESCRIPTION OF THE DRAWINGS

Further aspects of the invention and their advantages can be discerned in the following detailed description, with reference to the drawings in which like characters denote like parts and in which:

FIG. 3A is a magnified detail of FIG. 3 showing a closed position of a port valve;

FIG. 3B is a magnified detail of a port valve according to another embodiment of the present invention;

FIG. 5 is a magnified detail of a hydraulic hose assembly according to another embodiment of the present invention;

FIG. 12A is a magnified detail of FIG. 12; and

DETAILED DESCRIPTION

Various embodiments of the invention will be described herein with reference to the drawings. It will be understood that the drawings and the description set out herein are provided for illustration only and do not limit the invention as defined by the claims appended hereto and any and all their equivalents. For example, the terms referred to bicycle components conventionally mounted to a bicycle and with the bicycle orientated and used in a standard fashion unless otherwise indicated.

Figure 1:
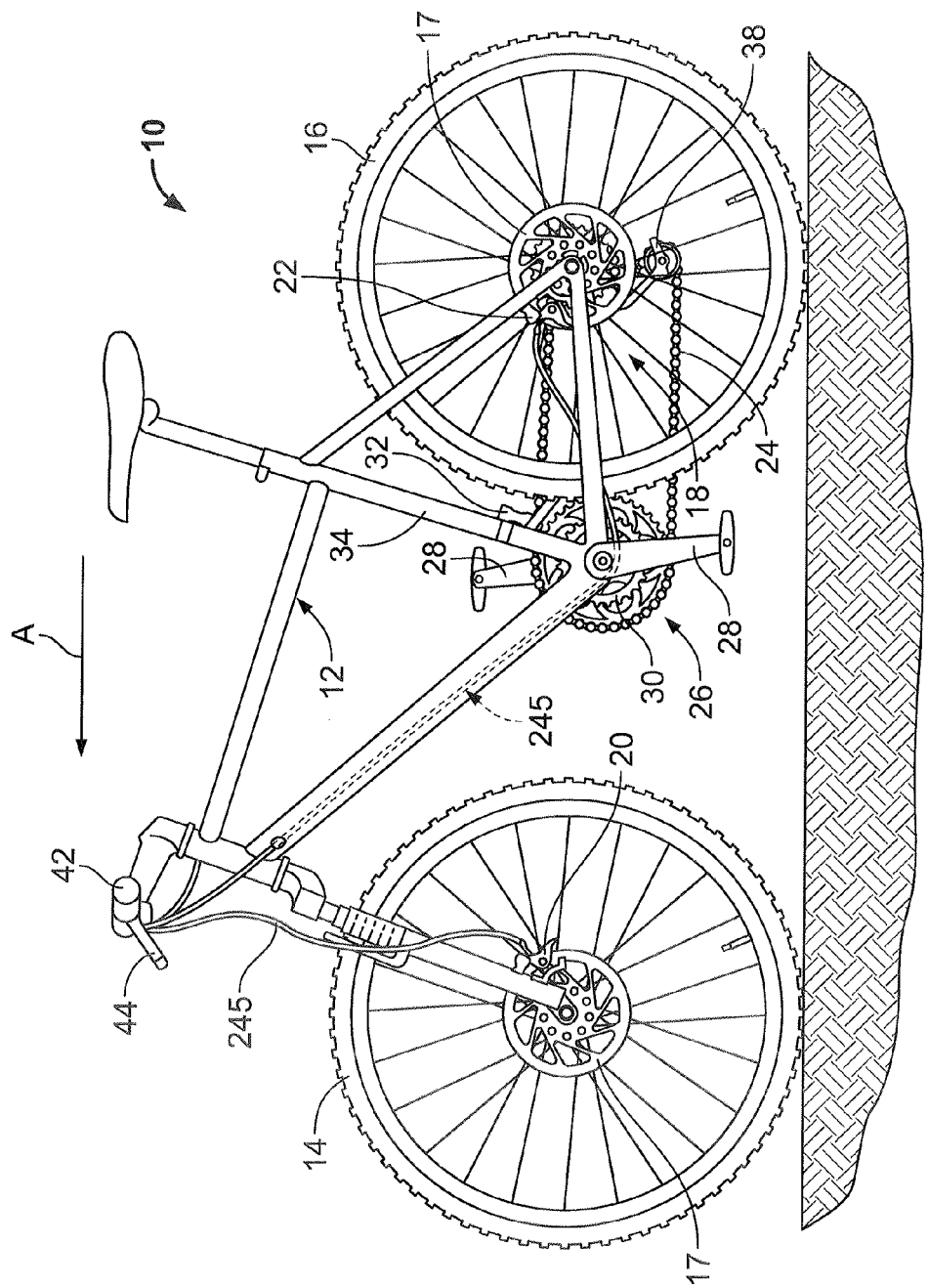
FIG. 1 is a side view of a mountain bike that may incorporate one embodiment of the present invention.

Referring to FIG. 1, numeral 10 generally indicates a bicycle that may incorporate one embodiment of the present invention. The bicycle 10 generally includes a frame 12, front and rear wheels 14, 16 rotatably attached to the frame 12, and a drivetrain 18. A front brake caliper assembly 20 is provided for braking the front wheel 14 and a rear brake caliper assembly 22 is provided for braking the rear wheel 16. The drivetrain 18 includes a chain 24, a front crank assembly 26 including crank arms 28 and a plurality of chainrings 30, a front derailleur 32 attached to a seat tube 34 of the frame 12, a rear sprocket assembly (not shown) coaxially mounted to the rear wheel 16 and a rear derailleur 38. The rear brake 22 is operated by a rear brake lever 44 located on the handlebar 42. The front brake 20 is operated by a rear brake lever (not shown) also located on the handlebar 42. The forward riding direction is indicated by the direction of arrow "A". While the illustrated bicycle 10 is a mountain bike, the present invention has applications to bicycles of any type, including road bikes and others, as well as bicycles with mechanical (e.g. cable, hydraulic, pneumatic) and non-mechanical (e.g. wired, wireless) drive systems.

Figure 2:
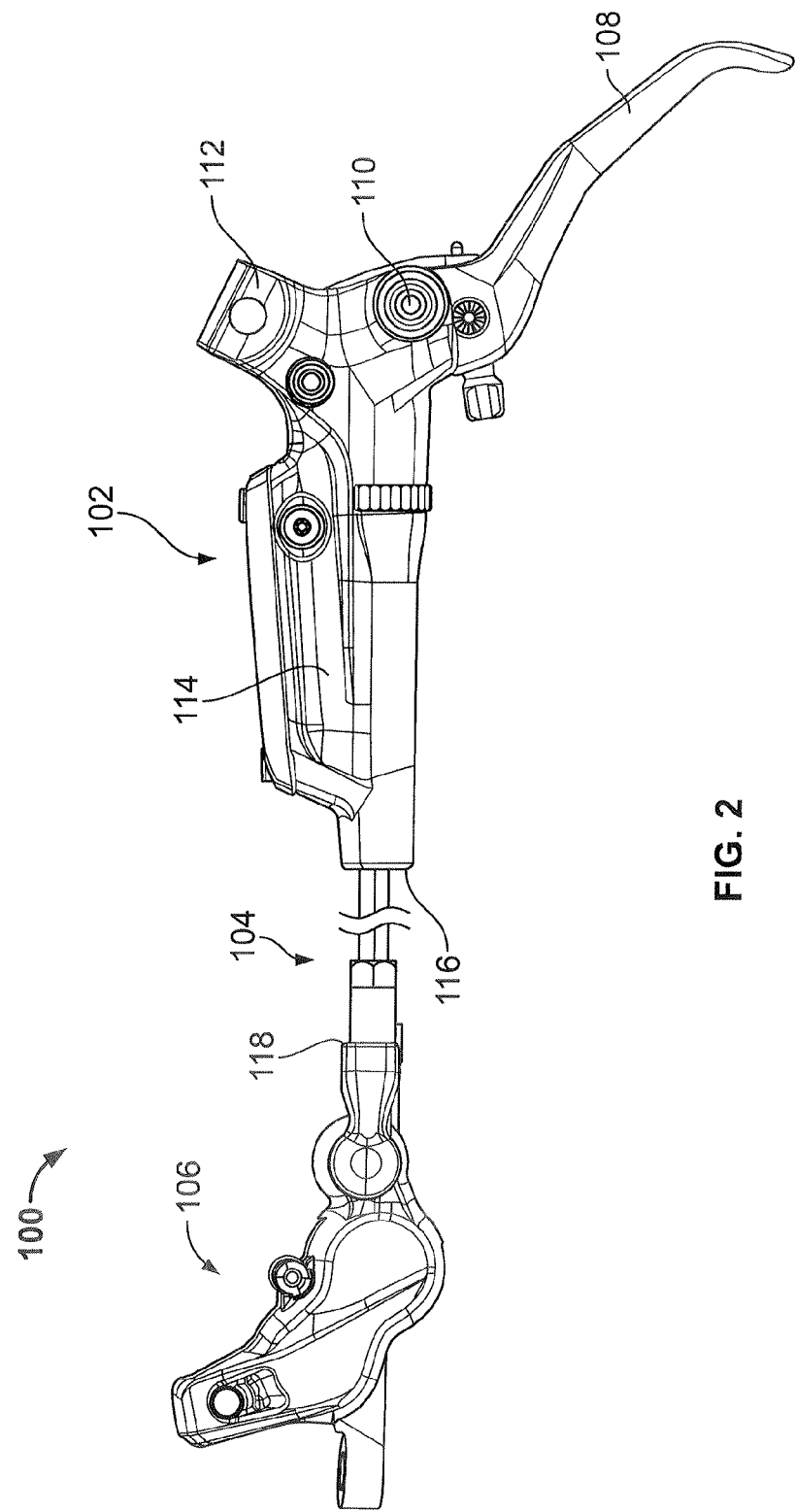
FIG. 2 is a side view of a hydraulic bicycle system incorporating one embodiment of the invention.

One embodiment of a hydraulic bicycle system is shown in FIG. 2 and is indicated generally at 100. The hydraulic bicycle system 100 is a hydraulic brake system that includes hydraulic bicycle components, in this embodiment a brake hand lever assembly 102 and a brake caliper assembly 106, and a hydraulic hose assembly 104. Alternatively, the hydraulic bicycle system may be a hydraulic suspension system or hydraulic shifting system. In operation, fluid chambers in components 102 and 106, and the interior of hose assembly 104, are filled with a continuous phase of hydraulic fluid. The illustrated brake hand lever assembly 102 is of the "mountain bike" type. The invention has application to other types of bicycles, as will be described in more detail later. The illustrated caliper assembly 106 is commonly found on "mountain bikes" as shown in FIG. 1 as caliper assemblies 20, 22 that compress a disk 17 circumferentially mounted around an axle of the bicycle wheels 14, 16. However, the present invention also has application to rim brake hydraulic caliper assemblies, of the type having calipers which compress a rim of the wheel between them.

The brake hand lever assembly 102 has a hand lever 108 that pivots around a pivot 110. The hand lever assembly 102 is adapted to be affixed to a bicycle handlebar by an attachment member or clamp 112. The illustrated "mountain bike" type assembly 102 further has a hydraulic fluid reservoir 114. Brake assembly 102 has a hydraulic hose connection port 116 which is adapted to receive an end of the hydraulic hose assembly 104.

The hydraulic hose assembly 104, here shown in an interrupted view so that only its ends are illustrated, fluidly connects the hand lever assembly 102 with the caliper assembly 106. A first end of the hydraulic hose assembly 104 is connected to the hydraulic hose connection port 116 while a second, remote end is connected to a hydraulic hose connection port 118 of the caliper assembly 106. In one embodiment of the invention, a port valve (described below) is provided only for hydraulic hose connection port 116, while no such port valve is provided for hydraulic hose connection port 118. In an alternative embodiment, a port valve 262 may also be provided for hydraulic hose connection port 118, see FIG. 11. Accordingly, the present invention may have a port valve in only one of the brake hand lever assembly and the brake caliper assembly or both.

Figure 3:
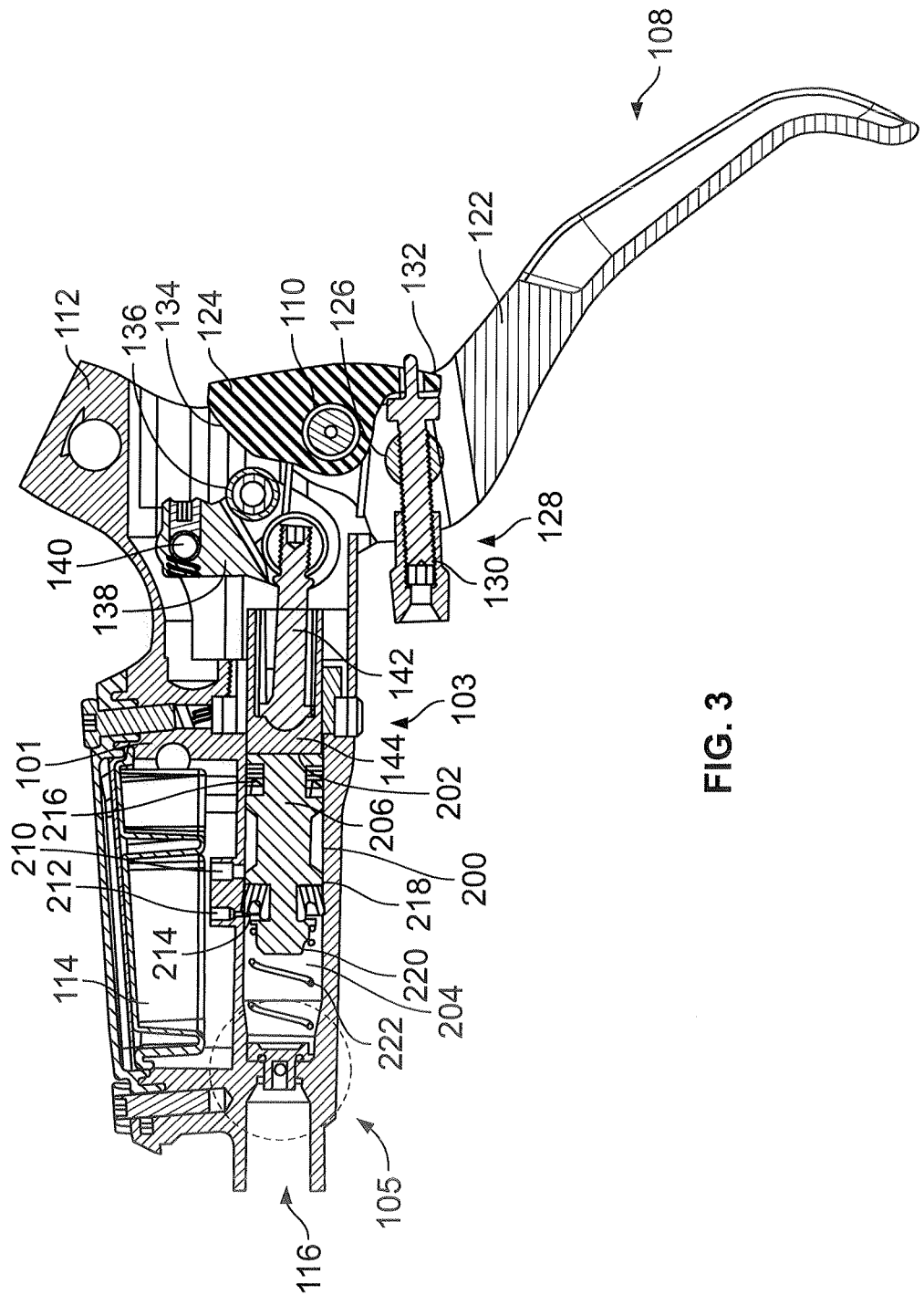
FIG. 3 is a sectional view of a brake hand lever assembly, shown prior to connection to a hydraulic hose assembly.

As shown in FIG. 3, the brake hand lever assembly 102 generally includes a housing 101, a piston assembly 103 and port valve assembly 105. The housing 101 includes an attachment portion 112 adapted to be attached to the handlebar 42 (FIG. 1). The housing 101 further includes a cylinder 200 that defines a hydraulic fluid chamber 204 and the hydraulic hose connection port 116 adapted to be connected to the hydraulic hose assembly 104. The hand lever 108 pivots around a pin or pivot 110 fixed to housing 101. In the illustrated embodiment, the hand lever 108 has two structural components: a blade 122 and a cam 124. The blade 122 pivots around a pivot 126 that is offset from pivot 110. A hand lever adjustment mechanism 128 includes a screw 130 that spaces an end 132 of the cam 124 from pivot 126, thereby adjusting the position of the blade 122 relative to the handlebar (not shown) on which the hand lever assembly 102 is mounted. A surface 134 of the cam 124 cams against a roller 136. The roller 136 is mounted on a follower 138 that pivots around a follower pin 140.

The piston assembly 103 is operatively connected to the follower 138. The piston assembly 103 generally includes a piston 206, a pushrod 142, a hollow cap member 144 and front and rear umbrella seals 214, 216. The pushrod 142 includes a rear end articuably connected to the follower 138. A front end of the pushrod 142 is seated within the hollow cap member 144 that itself is slidably received within a piston bore or cylinder 200.

A front wall 202 of the cap member 144 defines a rear end wall of the cylinder 200 in which the piston 206 is slidably disposed. Since the hydraulic bicycle component illustrated in FIG. 3 is a hand lever assembly, the piston 206 is a primary piston. In operation, the rider pulls the blade 122 toward the handlebar (not shown), or upward and to the right in FIG. 3, and through the linkage described above advances the primary piston 206 from the illustrated non-actuated position to an actuated position in which the piston 206 is forwardly displaced within cylinder 200, or to the left in FIG. 3.

In this embodiment, the housing 101 includes a fluid reservoir 114 that is fluidly connected to the cylinder 200 by a timing port 210 and a compensating port 212. Other embodiments may lack this reservoir. The piston 206 is equipped with circumferential, elastomeric umbrella seals 214 and 216 that slidably engage a sidewall 218 of the cylinder 200.

A front end 220 of the primary piston 206 is convexly curved in this illustrated embodiment. A helical compression spring 222 is disposed within fluid chamber 204, and partially within cylinder 200. A rear end of the spring 222 contacts the piston 206.

FIG. 3A illustrates the hydraulic hose connection port 116 and related structure in more detail. A frustoconical transition surface 224 joins cylinder 200 to a port valve cylinder 226. Port valve cylinder 226, which in this embodiment is sized to slidably receive the port valve assembly 105. The port valve assembly 105 includes a port valve 236 having a valve base 240 and a valve shaft 242. The valve base 240 terminates in a forward (in this view, left) direction by an end wall 228. The connection port 116 may include a hydraulic hose connection bore 230 that is sized to receive an end of the hydraulic hose assembly 104 and certain terminating structure as will be hereinafter described. The hose connection bore 230 terminates in a port external wall 232. A relatively restricted connection port passage 234 extends from port external wall 232 to end wall 228.

FIG. 3A shows the port valve 236 in a closed or sealed position, in which a forward face 238 of the valve base 240 seals against the end wall 228 of the valve cylinder 226. The valve shaft 242 forwardly extends from the forward face 238 of the valve base 240 to a free end 237 of the shaft 242. A length of the shaft 242 from its junction with the base 240 to its free end 237 is chosen to be longer than a length of the connection port passage 234. Therefore, the free end 237 of the valve shaft 242 will protrude into the hose connection bore 230. A forward end of the spring 222 contacts or is joined to a rear surface of the valve base 240, biasing the valve 236 to the closed position shown. A rear end of the spring 222 contacts or is operatively connected to the front end 220 of the piston 206, acting to bias the piston 206 to a non-actuated position. In other embodiments, the single spring 222 could be replaced with separate port valve and piston-biasing springs.

Figure 4:
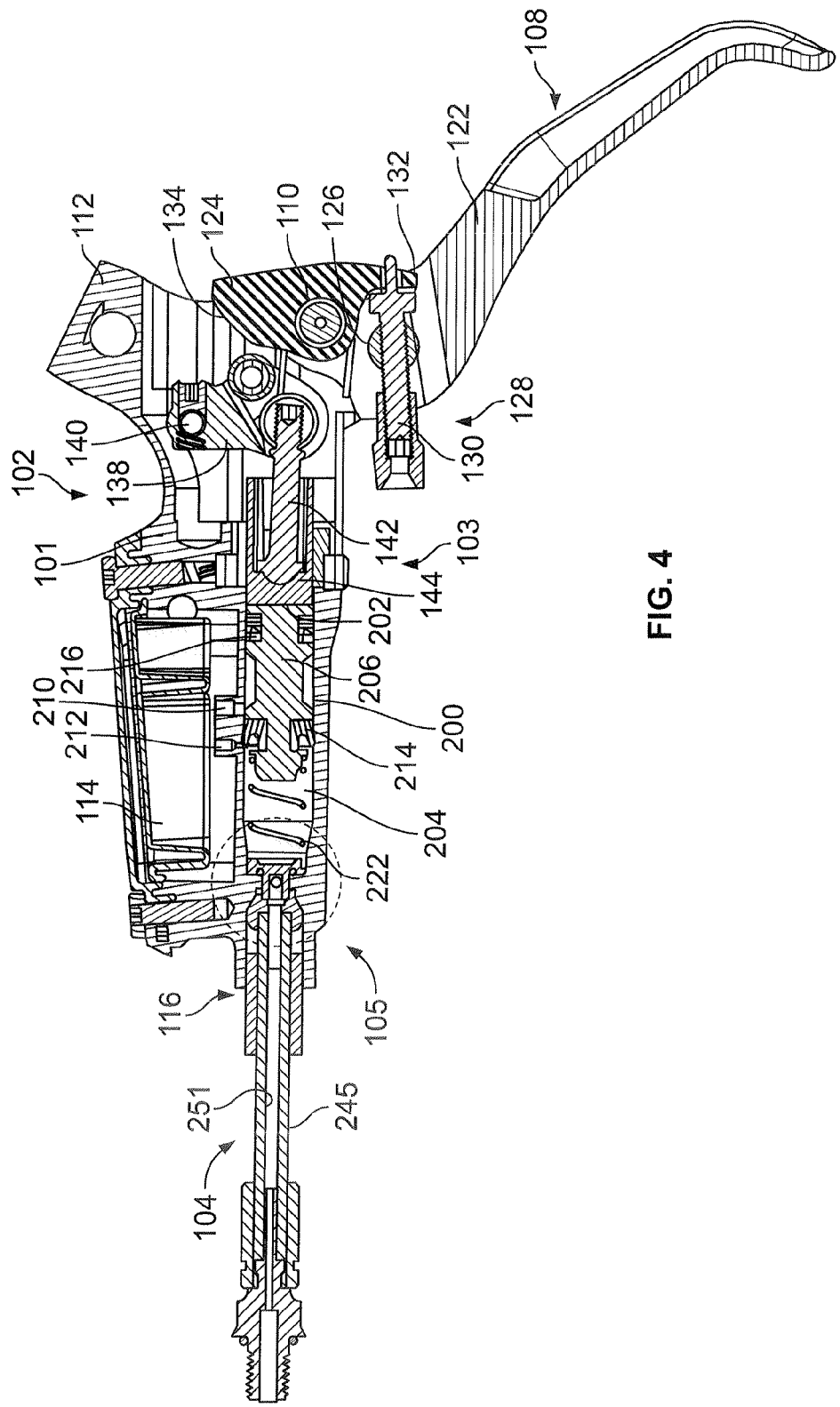
FIG. 4 is a sectional view of the brake hand lever assembly shown in FIG. 2, but showing a hydraulic hose assembly connected to the brake hand lever assembly.
Figure 4A:
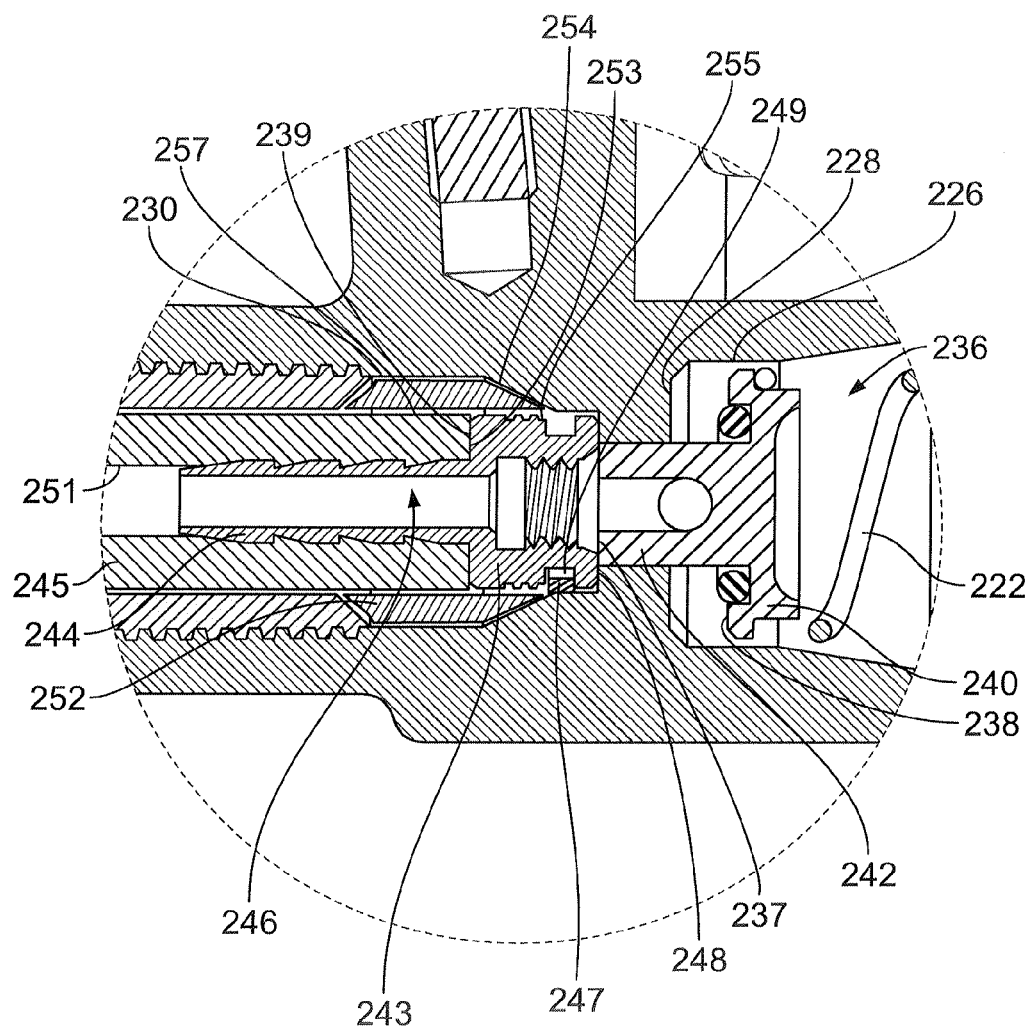
FIG. 4A is a magnified detail of FIG. 4, showing an open position of the port valve.
Figure 4B:
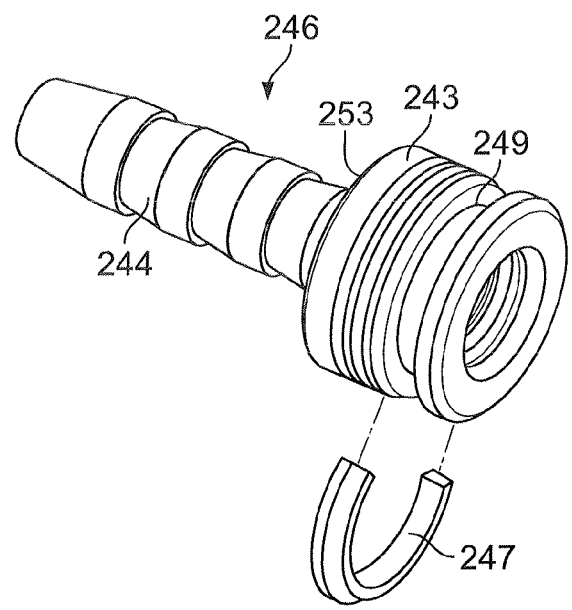
FIG. 4B is a perspective view of a hose end member of FIG. 4.
Figure 4C:
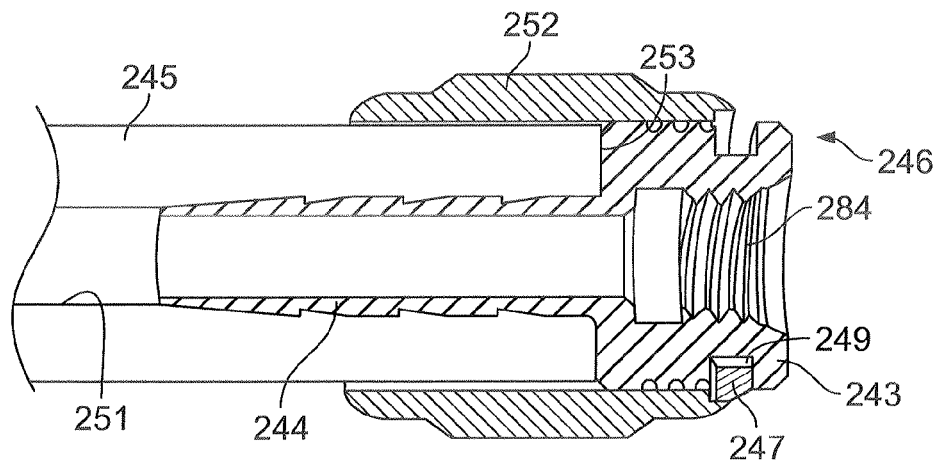
FIG. 4C is a partial cross-sectional view of a hydraulic hose assembly of FIG. 4.
Figure 6A:
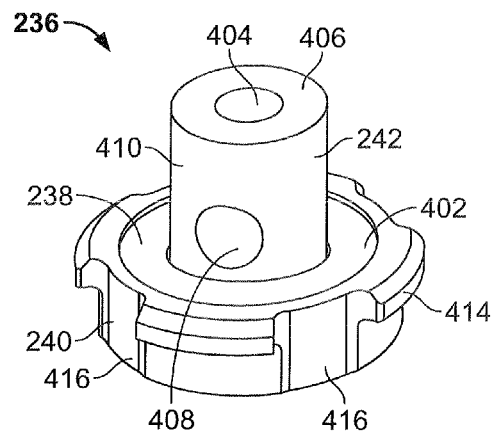
FIG. 6A is an isometric view of a port valve suitable for use with the invention.
Figure 6B:
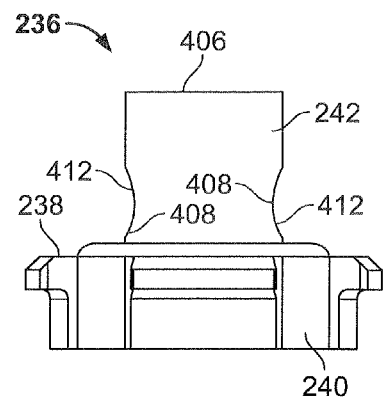
FIG. 6B is a side view of the port valve shown in FIG. 6A.
Figure 6C:
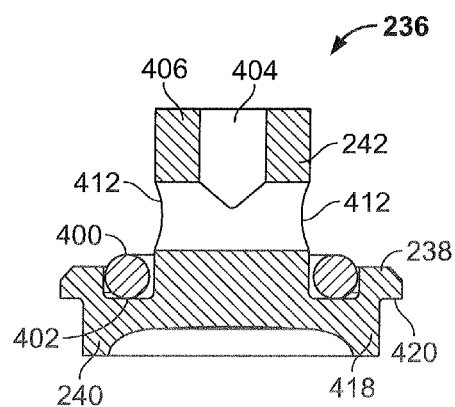
FIG. 6C is a sectional view of the port valve shown in FIG. 6A.
Figure 6D:
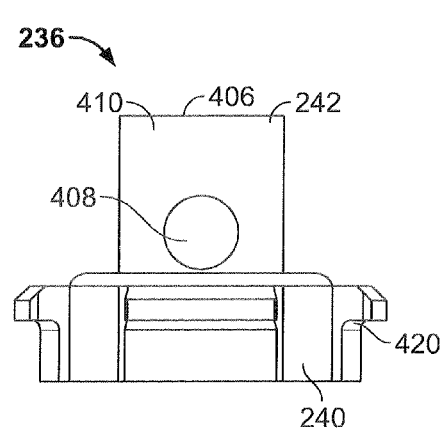
FIG. 6D is a side view of the port valve shown in FIG. 6A, the view being at ninety degrees to the view shown in FIG. 6B.
Figure 6E:
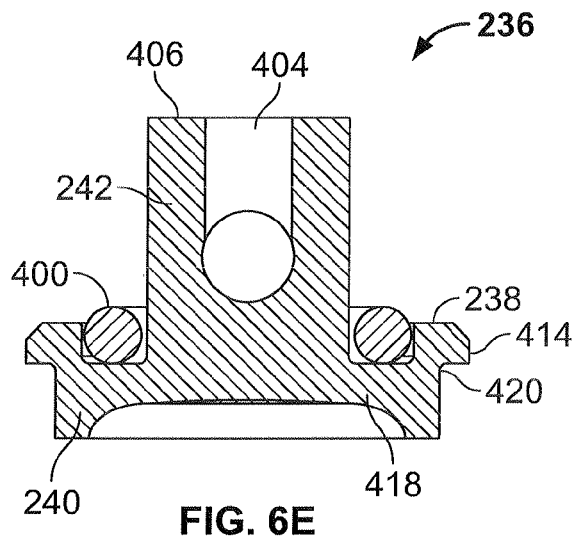
FIG. 6F is a sectional view of the port valve shown in FIG. 6A, the section taken substantially at 90 degrees from the section shown in FIG. 6C.

FIGS. 4 and 4A show the hand lever assembly 102 after the hydraulic hose assembly 104 has been connected to it. The hydraulic hose assembly 104 generally includes a hose 245 having a bore 251, a hose end member 246 and a hose sealing member or olive 252, see FIG. 4C. The hose end member or hose barb 246 includes a head portion 243 extending beyond an end 239 of the hose 245 and a stem portion 244 disposed in the hose bore 251. An end surface of the head portion 243 constitutes a contact surface 248 of the hose assembly 104. The retaining ring or snap ring 247 is disposed in a circumferential groove 249 in a radially exterior surface 255 of the head portion 243, see FIGS. 4B and 4C. The snap ring 247 protrudes beyond the radially exterior surface 255 of the head portion 243. The hose assembly 104 is assembled by inserting the hose barb 246 into the bore 251 of the hose 245. An end wall 253 of the head portion 243 of the hose barb 246 abuts the end 239 of the hose 245. Then, the hose 245 and barb 245 are inserted through a compression member or nut 250 and then through the olive 252. While the hose barb 246 is passing through the olive 252, the snap ring 247 is deflected radially inward until it passes through the olive 252 and then deflects radially outward, securing the olive 252 behind the snap ring 247. A first extent of the olive 252 is disposed about a radially exterior surface 257 of the end 239 of the hose 245 and a second extent is disposed about the radially exterior surface 255 of the head portion 243 of the hose barb 246.

This hose assembly 104 is then inserted the hose connection bore 230, an interior sidewall which is threaded. A terminal section 254 of the hose connection bore 230 is frustoconical and provides a surface against which olive 252 can be deformed or crushed. Once the hose assembly 104 is inserted, the compression nut 250 is threaded into the bore 230, axially deformably displacing the olive 252 against surface 254 and the snap ring 247. The snap ring 247 inhibits the olive 252 from deformably displacing beyond the contact surface 248 of the hose barb 246 to inhibit the olive 252 from interfering with the secure connection of the hydraulic hose assembly 104 to the hydraulic hose connection port 116. As the compression nut 250 continues to tighten, the pressure on the snap ring 247 causes the hose assembly 104 to be fully inserted into the connection port 116. After connection is completed, the contact surface 248 abuts external wall 232, and pushes the free end of valve shaft 242, and therefore the entire body of the valve 236, rearwardly, or to the right in this FIG. 4A. This unseals the forward face 238 of valve base 240 from the end wall 228. In an alternative embodiment shown in FIG. 5, the retaining ring 247 may be eliminated by threadably connecting a hose sealing member or an olive 530 to a hose end member or a hose barb 532. The hose barb 532 includes a head portion 540 extending beyond an end 239 of the hose 245 and a stem portion 542 disposed in the hose bore 251. The olive 530 may include threads 534 on an interior surface to mate with threads 536 on an exterior surface of the hose barb 532. The threaded connection between the olive 530 and the hose barb 532 inhibit the olive 530 from deformably displacing beyond a contact surface 538 of the hose barb 532 when the hose assembly 104 is connected to the hydraulic hose connection port 116, thereby ensuring displacement of the port valve 236 to the open position.

The position of port valve 236 in FIGS. 4 and 4A puts the hydraulic fluid chamber 204 in fluid communication with the bore 251 of hose 245. Pushing valve shaft 242 rearwardly uncovers second valve ports 256 (described in more detail below). In this embodiment, the port valve 236 is the only valve moved to place the hydraulic hose assembly 104 in fluid communication with the hydraulic fluid chamber 204 responsive to the connection of the hydraulic hose assembly 104 to the hydraulic hose connection port 116. As seen in FIG. 2A, when the port valve 236 is in the closed position, the second valve ports 256 are disposed within the connection port passage 234 and are therefore occluded thereby.

In the embodiment shown in FIGS. 2, 2A, 3 and 3A, the cylinder 200, transition surface 224, port valve cylinder 226, hose connection bore 230 and connection port passage 234 are all coaxial. Also, in this embodiment, a valve fluid chamber 258 which includes valve cylinder 226 is contiguous with the hydraulic fluid chamber 204. In other embodiments the hydraulic fluid chamber 204 and the valve fluid chamber 258 could be separated from each other or disposed at an angle to each other.

Figure 13:
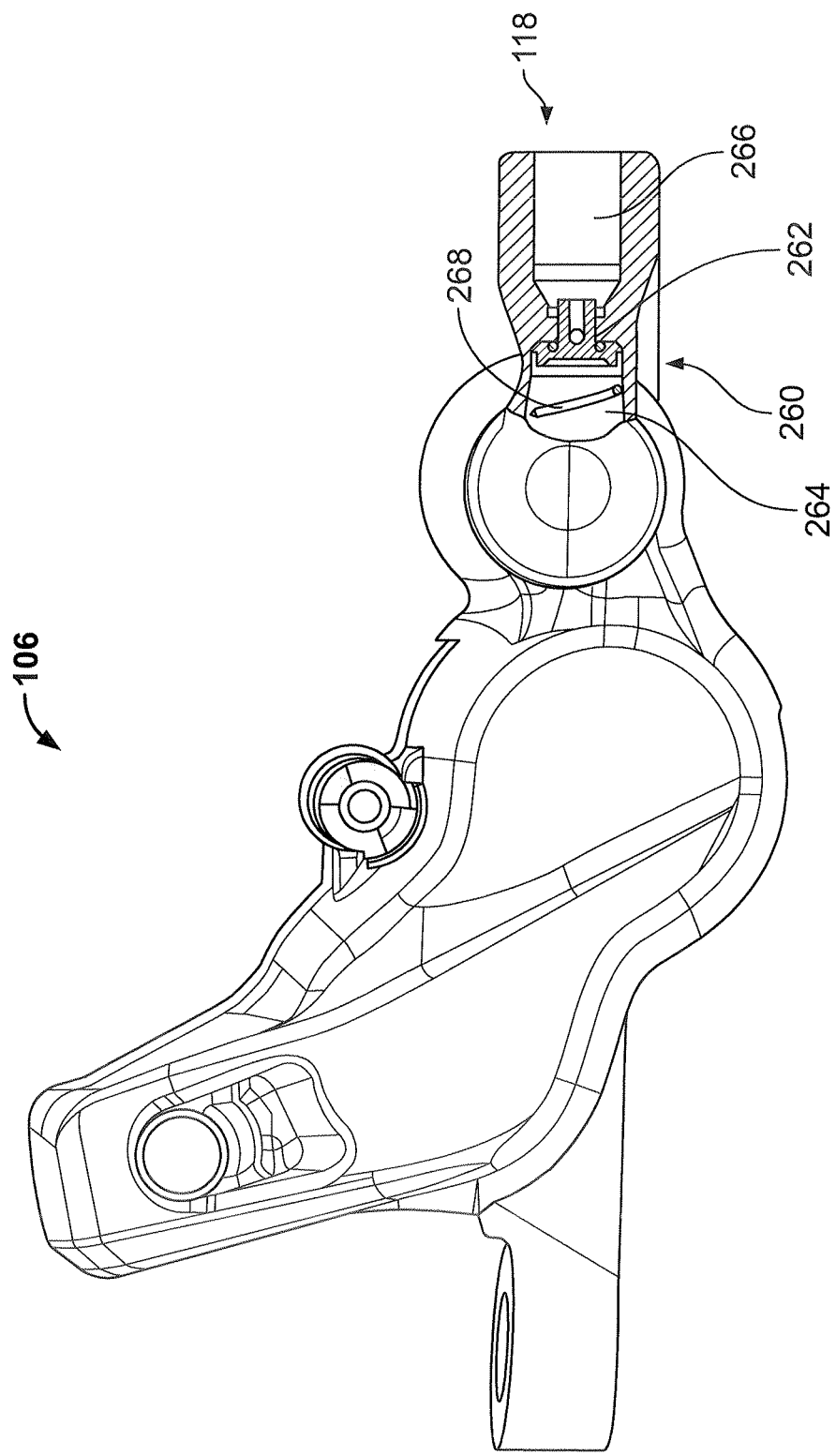
FIG. 13 is a side view, with parts broken away, of a brake caliper assembly of FIG. 2.

In the embodiment shown in FIG. 13, the caliper assembly 106 includes the hydraulic hose connection port 118 and a port valve assembly 260 that may be identical in structure to the port valve assembly 105 of the brake hand lever assembly. The valve assembly 260 includes a port valve 262 that operates similar to the port valve 236. The port valve 262 moves between an open position that places the hose assembly 104 in fluid communication with a hydraulic fluid chamber 264, and a closed position that seals the connection port 118. The port valve 262 opens when an end of the hydraulic hose assembly is inserted into a hose connection bore 266 thereby placing the hydraulic hose assembly in fluid communication with the hydraulic fluid chamber 264. The port valve 262 is biased toward the closed position by a spring 268. The spring 268 may also bias a secondary piston (not shown) that is slidably disposed in the same hydraulic fluid chamber 264.

One embodiment of port valve 236 is shown in more detail in FIGS. 6A-6E. A valve sealing member 400, in this embodiment an elastomeric O-ring, is seated in a circumferential groove 402. Groove 402 is cut into the forward face 238 of the base 240 and radially surrounds the valve shaft 242. The O-ring seals against the fluid chamber end wall 228 when the valve 236 is in the closed position. In an alternative embodiment shown in FIG. 3B, a valve sealing member 430 or elastomeric O-ring could instead or in addition be provided on fluid chamber end wall 228, which would then seal to the forward face 238 of the valve 236 when the valve 236 is moved to the closed position.

A first valve port 404 may be formed as a cylindrical bore coaxial with connection port passage 234, and opens onto the free end 406 of the valve shaft 242. A diameter of the first valve port 404 can be chosen to be no less than an interior diameter of the hose barb 246, so as not to inhibit flow rate. The free end 406 presents a flat surface which is adapted to abut the end face 248 of the hose barb 246 when the hose assembly 104 is affixed inside hose connection bore 230. The first valve port 404 intersects with at least one second valve port 408, which in turn opens on the sidewall 410 of the shaft 242. In the illustrated embodiment, there are two such second valve ports 408 opening on different locations of the shaft sidewall 410, and they are formed by a single cylindrical bore formed orthogonally to a cylindrical bore forming first valve port 404. To increase fluid flow, each second valve, port 408 has, at its opening onto sidewall 410, a concavely arcuate chamfer 412.

The valve base 240 has a circular margin 414 that is slidably engaged with the sidewall of the port valve cylinder 226 (FIGS. 2A and 3A). Axially aligned cut-outs 416 promote fluid flow between the second valve ports 408 and the hydraulic fluid chamber 204. A radius cut 420 may be made in the valve base 240 to seat a rear end of the helical compression spring 222.

Figure 7:
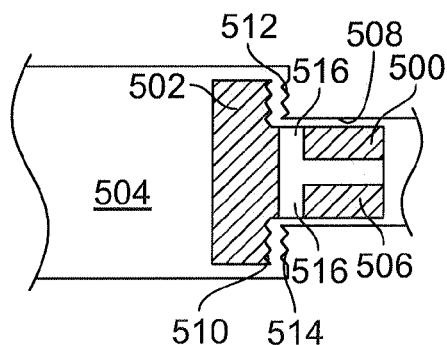
FIG. 7 is a schematic section view of a port valve and valve cylinder end wall according to an alternative embodiment of the invention.
Figure 8:
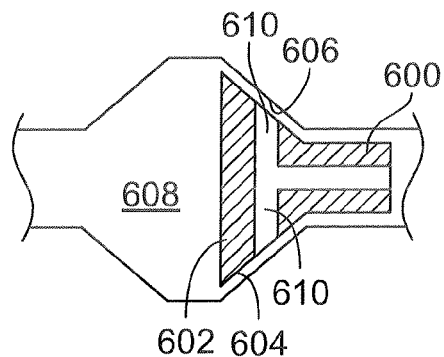
FIG. 8 is a schematic sectional view of a port valve and fluid chamber end wall according to a further alternative embodiment of the invention.

FIGS. 7 and 8 illustrate two alternative embodiments of a port valve. In FIG. 7, a port valve 500 has a base 502 that is disposed within a valve cylinder or hydraulic fluid chamber 504. A shaft 506 of the valve 500 extends forwardly (here, to the right) from the valve base 502. The shaft 506 is slidably received within a connection port passage 508. A forward face 510 of the base 502 is formed as a labyrinth, and this labyrinth mates, when the valve 500 is in the closed position, with a corresponding labyrinth 512 formed on the fluid chamber end wall 514. In an open position as shown, second ports 516 of the valve 500 become uncovered and permit fluid communication to and from the hydraulic fluid chamber 504.

In FIG. 8, a port valve 600 has a base 602 with a forward face 604 that is formed as a convex cone or, taper. An end wall 606 of the hydraulic fluid chamber 608 has a mating, concave cone or taper. When the valve 600 is in the closed position, the surfaces 604, 606 will seal with each other, inhibiting flow to and from the second valve ports 610.

Figure 9:
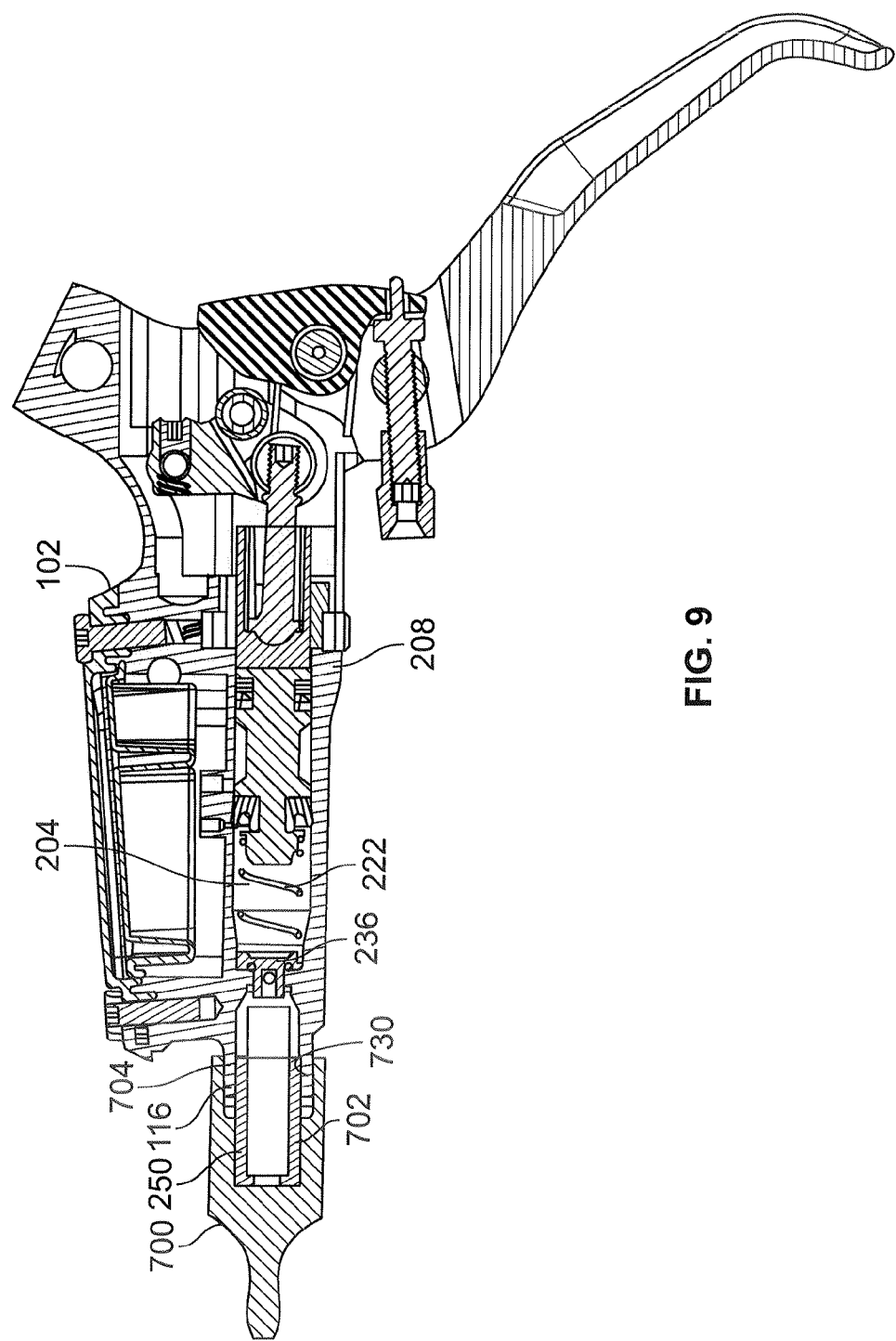
FIG. 9 is a sectional view of a brake hand lever assembly in a condition as it might be provided to an end user.

FIG. 9 is a sectional view of a hydraulic brake hand lever assembly 102 in a condition in which it might be shipped to or otherwise provided to an end user. The hydraulic fluid chamber 204 inside assembly housing 208 is filled with hydraulic fluid. The valve 236 is urged by spring 222 to its closed position, sealing in the hydraulic fluid. A compression nut 250 is inserted into hose connection bore 230. Over the compression nut 250 is installed an elastomeric or other thermoplastic cap 700. An inner bore 702 of the cap fits over the compression nut 250. An outer bore 704 of the cap fits over an outer sidewall of the hydraulic hose connection port 116. In assembling or re-assembling a hydraulic brake system, the end user removes the cap 700 and inserts the hydraulic hose assembly. Twisting the compression nut 250 completes the connection.

Figure 10:
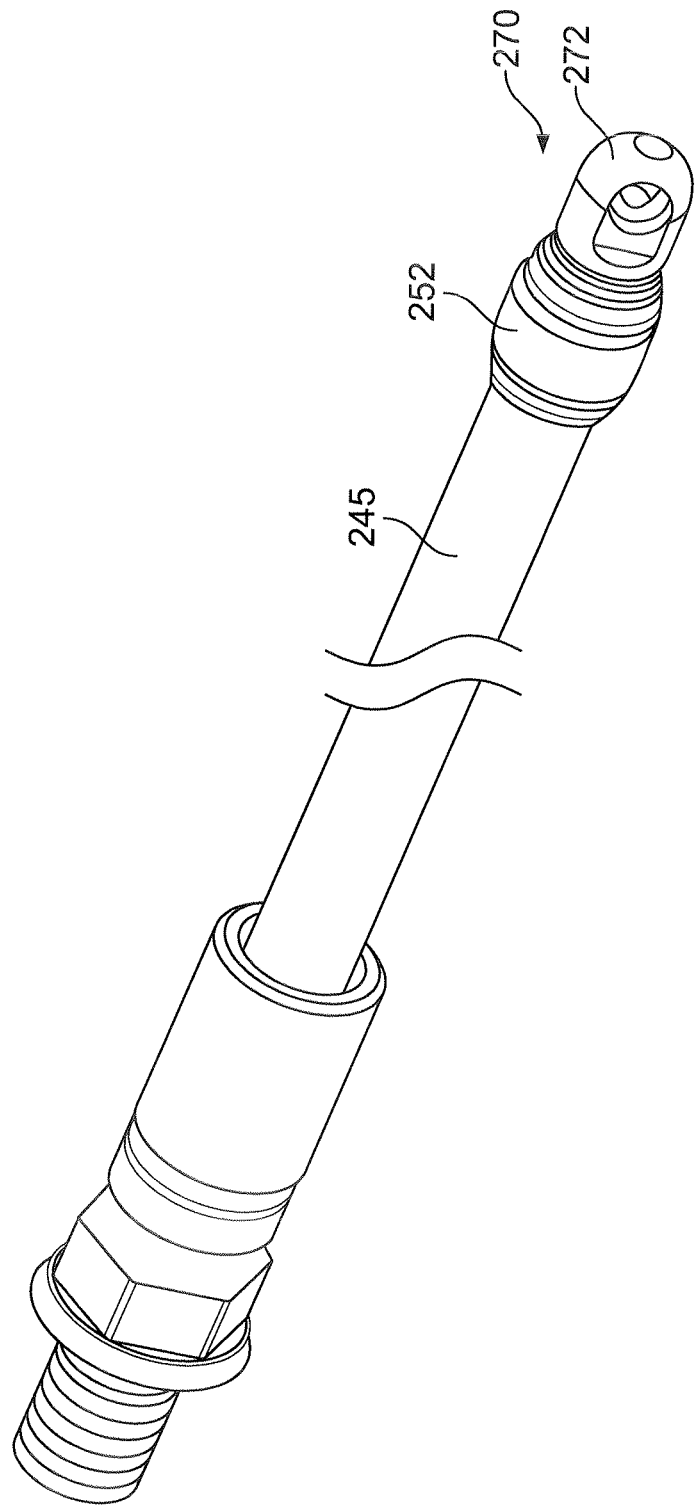
FIG. 10 is a perspective view of a hydraulic hose assembly and a routing tool attached thereto.
Figure 11:
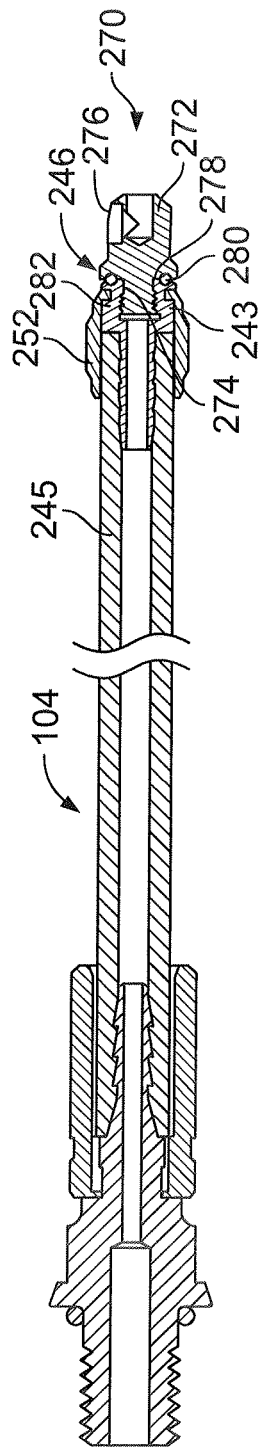
FIG. 11 is a cross-sectional view of the hydraulic hose assembly and the routing tool of FIG. 10.

Looking to FIGS. 10 and 11, a routing member or fishing tool 270 is provided to route the hydraulic hose assembly 104 between the brake hand lever assembly 102 and the brake caliper assembly 106 through the bicycle frame 12. The routing member 270 includes a head portion 272 and a stem portion 274. The head portion 272 includes an opening 276 for receiving a pulling member such as a wire or cable (not shown). The pulling member is used to pull the routing member 270 and the hydraulic hose assembly 104, attached thereto, through the frame 12. To prevent the hydraulic fluid from leaking out of the hose 245, the head portion 272 includes a forward face 278 having a sealing member 280, in this embodiment an O-ring, which seals against the hose barb 246. The stem portion 274 has external threads 282 threadably engaged with mating internal threads 284 on the hose barb 246 (see FIG. 4C). When routing of the hydraulic hose assembly 104 through the frame 12 is complete, the routing member 270 is threadably detached from the hose barb 246 to permit connection of the hose assembly 104 to the connection port 116 of the brake hand lever assembly 102.

Figure 12:
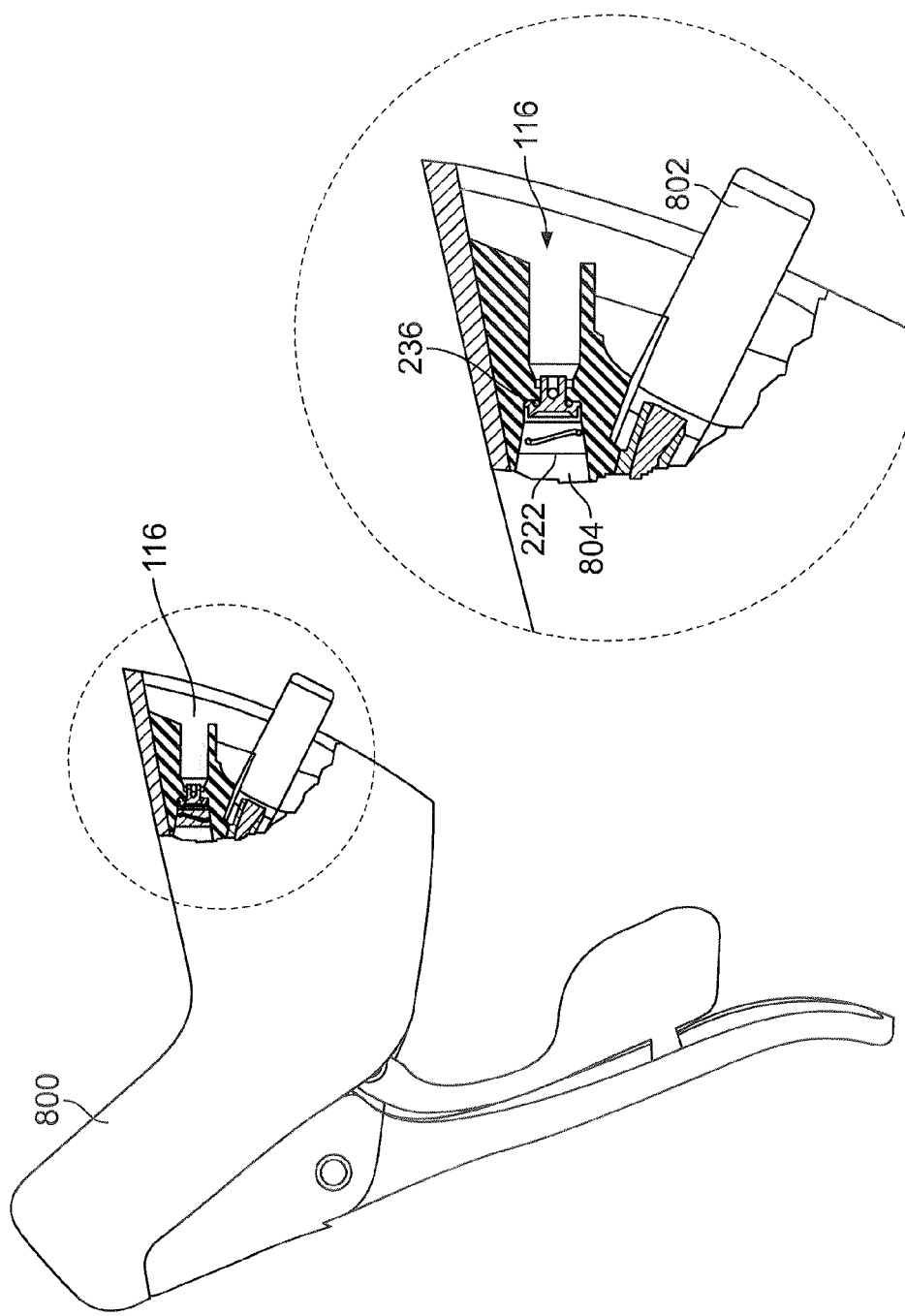
FIG. 12 is a side view with parts broken away of a "road bike" hydraulic hand lever assembly according to the invention.

Another embodiment of the invention is illustrated in FIGS. 12 and 12A. A hydraulic road brake hand lever assembly 800 has a hydraulic hose connection port 116 and associated port valve 236 that can be identical in structure to that used in the mountain bike hand lever assembly 102. The location of the connection port 116 is proximate to the location of an attachment member or clamp 802. The valve 236 is shown in a closed position as biased by spring 222. A forward end of the spring 222 can be operatively connected to a master piston (not shown) and the master piston and valve 236 can reside in the same hydraulic fluid chamber 804. The present invention also has application to road rim brake caliper assemblies. In an alternative embodiment for a road brake hand lever assembly, the connection port 116 may not be located proximate the attachment member 802.

In summary, a hydraulic brake assembly has been shown and described featuring a port valve associated with the hydraulic hose connection port. Technical advantages in here from positioning a valve cylinder and a piston cylinder on the same axis in the same fluid chamber, and in sharing a biasing spring. The port valve enhances the ability to ship the hydraulic brake assembly as a separate unit as pre-filled with hydraulic fluid, and more easily permits the routing of hydraulic brake lines through the bicycle frame while minimizing air ingestion during connection.

While illustrated embodiments of the present invention have been described and illustrated in the appended drawings, the present invention is not limited thereto but only by the scope and spirit of the appended claims.

We claim:

1. A hydraulic bicycle component comprising:
   a housing adapted to be affixed to a frame or handlebar of a bicycle, the housing including a cylinder defining a hydraulic fluid chamber and a hydraulic hose connection port adapted to be connected to a hydraulic hose assembly;
   a piston assembly including a piston slidably disposed within the cylinder, the piston configured to slide between a non-actuated position and an actuated position; and
   a port valve assembly including a port valve configured to move between an open position placing the hydraulic hose assembly in fluid communication with the hydraulic fluid chamber and a closed position sealing the hydraulic hose connection port, the port valve moving to the open position responsive to the connection of the hydraulic hose assembly to the hydraulic hose connection port,
   wherein the port valve is biased toward the closed position, the piston is biased toward the non-actuated position, and the port valve and the piston are biased by a single spring.

2. The hydraulic bicycle component of claim 1, wherein the housing includes a port valve cylinder coaxial with the cylinder, the port valve moving within the port valve cylinder between the open and closed positions, the single spring being helical and positioned along the cylinder between the port valve and the piston.

3. The hydraulic bicycle component of claim 1, wherein the port valve includes a valve sealing member sealing the hydraulic hose connection port when the port valve is in the closed position.

4. The hydraulic bicycle component of claim 1, wherein the hydraulic fluid chamber includes an end wall, a valve sealing member disposed on the end wall, the valve sealing member sealing to the port valve when the port valve is in the closed condition.

5. The hydraulic bicycle component of claim 1, wherein the hydraulic hose connection port includes a hydraulic hose connection bore adapted to receive the hydraulic hose assembly, an inner end of the hose connection bore defined by a port external wall, the hydraulic fluid chamber having an end wall opposed to the connection port external wall, a connection port passage formed between the connection port external wall and the end wall of the hydraulic fluid chamber;
   the port valve having a base and a shaft forwardly extending from the base into the connection port passage, the shaft having a free end opposed to the base and a sidewall extending from the base to the free end, a first valve port opening on the free end of the shaft and extending rearwardly into the shaft, at least one second valve port opening on the sidewall of the shaft and intersecting the first valve port;
   a forward face of the base sealing with the end wall of the hydraulic fluid chamber when the port valve is in the closed position, a length of the shaft from the free end to the base being greater than a length of the connection port passage, the free end protruding into the hose connection bore when the port valve is in the closed condition, the at least one second valve port occluded by a sidewall of the connection port passage when the port valve is in the closed position; and
   the free end of the shaft adapted to be pushed by a hydraulic hose assembly end face to displace the port valve rearwardly to the open position, the forward face of the base unsealing from the end wall of the hydraulic fluid chamber when the port valve moves to the open position, the at least one second port being in fluid communication with the fluid chamber when the port valve is in the open position.

6. The hydraulic bicycle component of claim 5, wherein the forward face of the base of the port valve includes an elastomeric O-ring radially surrounding the shaft and adapted to seal against the hydraulic fluid chamber end wall.

7. The hydraulic bicycle component of claim 6, wherein a circumferential groove is cut into the forward face of the base to seat the O-ring.

8. The hydraulic bicycle component of claim 5, wherein the end wall of the hydraulic fluid chamber has a labyrinth surface, the forward face of the base of the port valve having a mating labyrinth surface.

9. The hydraulic bicycle component of claim 5, wherein the end wall of the hydraulic fluid chamber is tapered, the forward face of the base of the port valve having a mating taper.

10. The hydraulic bicycle component of claim 5, wherein the at least one second port is one of a plurality of second ports of the port valve each intersecting the first port of the port valve, each of the second ports opening on the shaft sidewall at a different location.

11. The hydraulic bicycle component of claim 10, wherein the first port of the port valve and the second ports of the port valve are formed by cylindrical bores, the second valve ports including two second ports formed by a bore orthogonal to a bore of the first port.

12. The hydraulic bicycle component of claim 5, wherein the end wall of the hydraulic fluid chamber terminates a port valve cylinder, a circular margin of the base disposed to be slidably adjacent a sidewall of the port valve cylinder, a plurality of cutouts formed in the circular margin of the port valve base to permit fluid flow between the at least one second port and the hydraulic fluid chamber.

13. The hydraulic bicycle component of claim 5, wherein the at least one second port is formed by a cylindrical bore, a concave chamfer formed at the junction of the cylindrical bore and the shaft sidewall to enhance fluid flow to and from the at least one second port.

14. The hydraulic bicycle component of claim 5, wherein the port valve and the piston are axially disposed in relation to each other in the hydraulic fluid chamber.

15. The hydraulic bicycle component of claim 1, wherein the hydraulic bicycle component is a brake hand lever assembly.

16. The hydraulic bicycle component of claim 1, wherein the hydraulic bicycle component is a brake caliper assembly.

17. The hydraulic bicycle component of claim 3, wherein the port valve includes a valve sealing member sealing the hydraulic hose connection port when the port valve is in the closed position.

18. The hydraulic bicycle component of claim 3, wherein the hydraulic fluid chamber includes an end wall, a valve sealing member disposed on the end wall and sealing to the port valve when the port valve is in the closed position.

19. The hydraulic bicycle component of claim 3, wherein the hydraulic hose connection port includes a hydraulic hose connection bore adapted to receive the hydraulic hose assembly, an inner end of the hose connection bore defined by a connection port external wall, the hydraulic fluid chamber having an end wall opposed to the port external wall, a connection port passage formed between the port external wall and the end wall of the hydraulic fluid chamber;

the port valve having a base and a shaft forwardly extending from the base into the connection port passage, the shaft having a free end opposed to the base and a sidewall extending from the base to the free end, a first valve port opening on the free end of the shaft and extending rearwardly into the shaft, at least one second valve port opening on the sidewall of the shaft and intersecting the first valve port;

a forward face of the base sealing with the end wall of the hydraulic fluid chamber when the port valve is in the closed position, a length of the shaft from the free end to the base being greater than a length of the connection port passage, the free end protruding into the hose connection bore when the port valve is in the closed position, the at least one second valve port occluded by a sidewall of the connection port passage when the port valve is in the closed position; and the free end of the shaft adapted to be pushed by a hydraulic hose end face to displace the port valve rearwardly to the open position, the forward face of the base unsealing from the end wall of the hydraulic fluid chamber when the port valve moves to the open position, the at least one second port being in fluid communication with the fluid chamber when the port valve is in the open position.

20. The bicycle hydraulic component of claim 19, wherein the forward face of the base of the valve includes an elastomeric O-ring radially surrounding the shaft and adapted to seal against the hydraulic fluid chamber end wall.

21. The hydraulic bicycle component of claim 20, wherein a circumferential groove is cut into the forward face of the base to seat the O-ring.

22. The hydraulic bicycle component of claim 19, wherein the end wall of the hydraulic fluid chamber has a labyrinth surface, the forward face of the base of the port valve having a mating labyrinth surface.

23. The hydraulic bicycle component of claim 19, wherein the end wall of the hydraulic fluid chamber is tapered, the forward face of the base of the port valve having a mating taper.

24. The hydraulic bicycle component of claim 19, wherein the at least one second port is one of a plurality of second ports of the valve each intersecting the first port of the valve, each of the second ports opening on the shaft sidewall at a different location.

25. The hydraulic bicycle component of claim 24, wherein the first port of the valve and the second ports of the valve are formed by cylindrical bores, the second ports including two second ports formed by a bore orthogonal to a bore of the first port.

26. The hydraulic bicycle component of claim 19, wherein the end wall of the hydraulic fluid chamber terminates a port valve cylinder, a circular margin of the base positioned to be slidably adjacent a sidewall of the port valve cylinder, a plurality of cutouts formed in the circular margin of the base to permit fluid flow between the at least one second port and the hydraulic fluid chamber.

27. The hydraulic bicycle component of claim 19, wherein the at least one second port is formed by a cylindrical bore, a concave chamfer formed at the junction of the last the cylindrical bore and the shaft sidewall to enhance fluid flow to and from the at least one second port.

28. The hydraulic bicycle component of claim 19, wherein the port valve and the piston are axially disposed in relation to each other in the hydraulic fluid chamber.

29. The hydraulic bicycle component of claim 3, wherein the hydraulic bicycle component is a brake hand lever assembly.

30. The hydraulic bicycle component of claim 1, wherein at least a portion of the port valve is disposed within the cylinder.

31. The hydraulic bicycle component of claim 30, further comprising a single spring operatively connected to the port valve and the piston, the single spring biasing the piston to the non-actuated position and biasing the port valve to the closed position.

32. The hydraulic bicycle component of claim 30, wherein the cylinder includes an end wall, a connection port passage opening on the end wall, the port valve including a base with a forward face, the forward face sealing with the end wall around the connection port passage when the port valve is in the closed position.

33. The hydraulic bicycle component of claim 32, wherein the forward face of the base of the port valve includes a valve sealing member that seals with the end wall of the cylinder when the port valve is in the closed position.

34. The hydraulic bicycle component of claim 33, wherein a circumferential groove is formed in the forward face of the base of the port valve to seat the valve sealing member.

35. The hydraulic bicycle component of claim 32, wherein a labyrinth is formed on the end wall of the cylinder, the forward face of the valve base having a mating labyrinth surface.

36. The hydraulic bicycle component of claim 32, wherein the end wall of the cylinder is tapered, the forward face of the valve base having a mating taper.

37. The hydraulic bicycle component of claim 30, wherein the hydraulic hose connection port includes a hydraulic hose connection bore adapted to receive the hydraulic hose assembly, an inner end of the hose connection bore defined by a port external wall, the end wall of the cylinder opposed to the port external wall, a connection port passage formed between the port external wall and the end wall of the cylinder;

the port valve having a shaft forwardly extending from the base into the connection port passage, the shaft having a free end opposed to the base and a sidewall extending from the base to the free end, a first valve port opening on the free end of the shaft and extending rearwardly into the shaft, at least one second valve port opening on the sidewall of the shaft and intersecting the first valve port;

a length of the shaft from the free end to the base being greater than a length of the connection port passage, the free end protruding into the hose connection bore when the port valve is in the closed position, the at least one second valve port occluded by a sidewall of the connection port passage when the port valve is in the closed position; and the free end of the shaft adapted to be pushed by a hydraulic hose assembly end face to displace the port valve rearwardly to the open position, the at least one second valve port being in fluid communication with the hydraulic fluid chamber when the port valve is in the open position.

38. The hydraulic bicycle component of claim 37, wherein the at least one second valve port is one of a plurality of second valve ports each intersecting the first valve port, each of the second valve ports opening on the shaft sidewall at a different location.

39. The hydraulic bicycle component of claim 38, wherein the first and second valve ports are formed by cylindrical bores, the plurality of second ports including two second valve ports formed by a bore orthogonal to a bore of the first port.

40. The hydraulic bicycle component of claim 37, wherein a circular margin of the base positioned to be slidably adjacent a sidewall of the cylinder, a plurality of cutouts formed in the circular margin of the base to permit fluid flow between the at least one second port and the hydraulic fluid chamber.

41. The hydraulic bicycle component of claim 1, further comprising an attachment member adapted to affix the housing to a handlebar or frame of the bicycle, the hydraulic hose connection port disposed proximate the attachment member.

* * * * *